Jan. 30, 1968
C. C. RAYBURN
3,366,853
WOUND CAPACITOR
Filed June 27, 1966
2 Sheets-Sheet 1
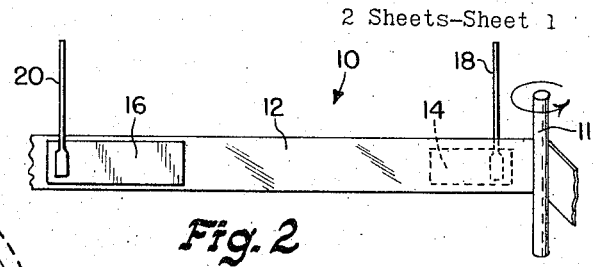
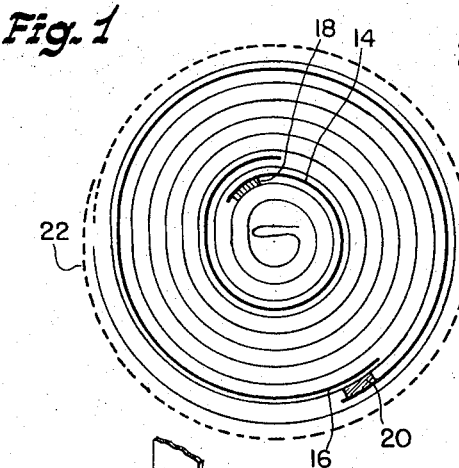
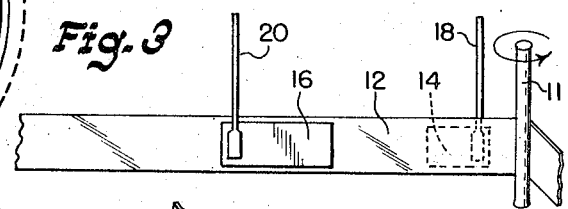
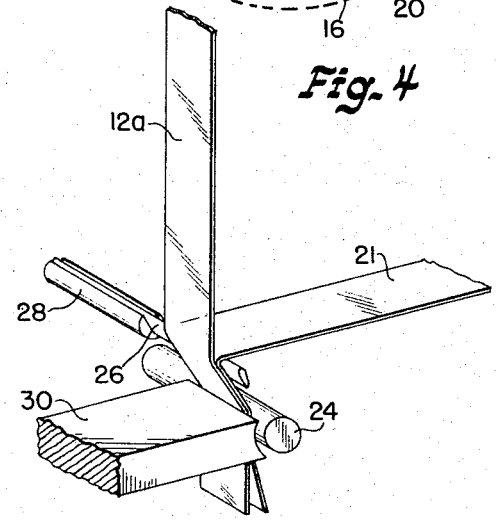
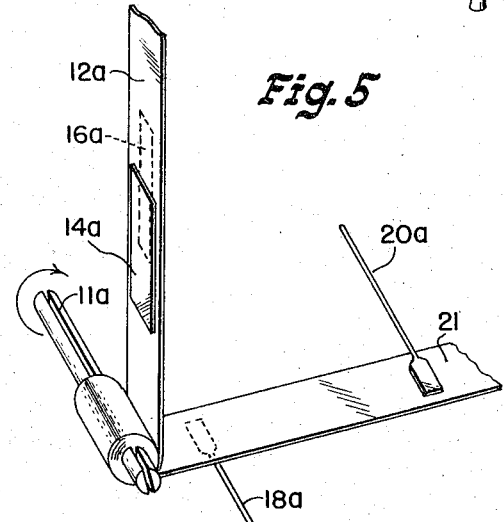
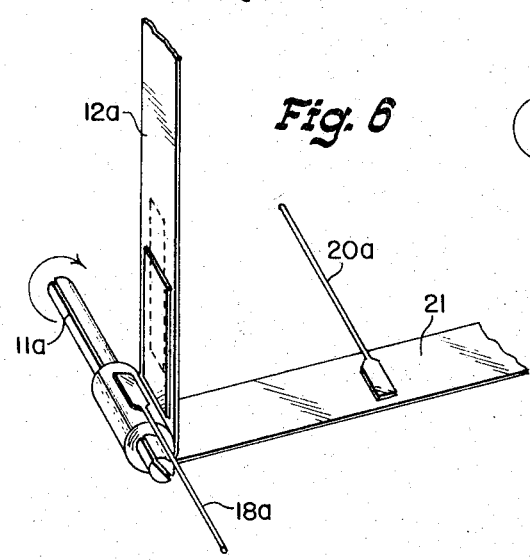
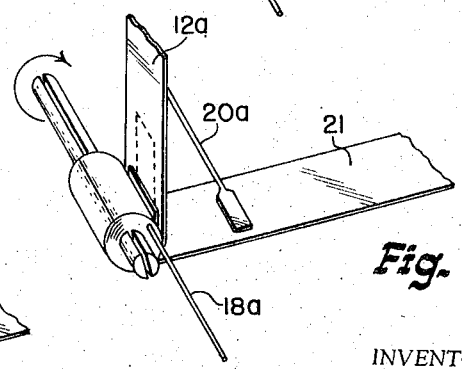
INVENTOR.
Charles C. Rayburn
BY Barry L. Clark
Robert W. Beart
His Att'ys Jan. 30, 1968  C. C. RAYBURN  3,366,853
WOUND CAPACITOR Filed June 27, 1966  2 Sheets-Sheet 2

INVENTOR.
Charles C. Rayburn
BY Barry L. Clark
Robert W. Beart
His Att'ys

United States Patent Office 3,366,853
Patented Jan. 30, 1968

3,366,853
WOUND CAPACITOR
Charles C. Rayburn, Falls Church, Va., assignor to Illinois Tool Works Inc., Chicago, Ill., a corporation of Delaware
Filed June 27, 1966, Ser. No. 560,741
6 Claims. (Cl. 317—260)

ABSTRACT OF THE DISCLOSURE

Wound capacitor has leads positioned so as to be out of the region of electrical stress between the electrodes for preventing possible damage to the dielectric in the region of electrical stress caused by soldering heat or by the leads. Preferably, the leads are attached to the dielectric and then wound into contact with the electrodes.

---

This invention relates to precision value capacitors, and more particularly, to capacitors which have their leads attached in such a manner that the leads will be firmly held within the capacitor but will not extend into the electric field region of the capacitor.

The value of a capacitor is determined by the relationship:

Equation 1
$$C = \frac{KA}{t}$$

where C is the capacitance value, K is a constant of the dielectric, A is the electrode area in common, and $t$ is the dielectric thickness. The value of K remains fixed for a given dielectric at any fixed frequency and temperature. To achieve a desired capacitance C, either of the variables A or $t$ can be changed. In a wound capacitor, A is varied by changing the common electrode width and the electrode length, while $t$ is varied by changing the dielectric thickness or gauge. If the electrodes, commonly supplied in the form of foil strips, are accurately slit to width, then accurately guided, the common electrode width may be maintained to a fraction of 1 percent even for narrow foil widths of ¼ inch. However, the other factor determining area, common length, is difficult to control with an accuracy of better than plus or minus 5 percent in lengths of 4 inches or less with any conventional capacitor winding machine. Since low value capacitors require very short lengths of foil, the inaccuracy in length cutting is quite significant.

Although wound capacitors offer many advantages, they are seldom produced in values below 5,000 picofarads and especially below 1,000 picofarads since the yield is extremely poor as a result of the broad value distribution due to the inability to control the electrode length accurately. Accordingly, in the value range of 1–1000 picofarads, other systems such as those using ceramics, mica, vitreous enamel, or glass have been used, depending on the particular set of performance characteristics desired. Although it has been recognized that inexpensive thin plastic films such as polypropylene, polyester, polycarbonate and polystyrene can generally duplicate the performance characteristics of the dielectric materials noted above, the high costs of rejects and labor have prevented such films from being competitive.

Wound capacitors are normally fabricated from strips or tapes of conductive electrode material, such as metal foil or a conductively coated dielectric, wound into a tight coil. In winding the capacitor coil or body, two or more conductive strips are wound together with dielectric material positioned therebetween to insulate them from each other. Usually, capacitors made in this fashion comprise extended lengths of conductive strips including several turns. The conductive strips are normally staggered so that the edge of one extends toward one end of the capacitor and the edge of the other extends toward the other end. By winding the strips in this fashion, the strips are isolated from one another at the ends of the capacitor so that leads can be soldered, welded, or held in mechanical or other fashion thereto.

Although end attached leads are quite satisfactory for many capacitors, they have deficiencies when used with extremely low value capacitors. For example, capacitors in the extremely low value range in the order of 1–500 picofarads require such a short length of conductive strip that they would offer too little area of metal contact at the end of the capacitor to assure a good strong contact. Accordingly, it has been conventional to insert leads into the interior of such very low value capacitors. The leads are normally welded or soldered to the electrode material or else merely laid against the electrode where they are held by the friction against the capacitor windings when the capacitor is wound. The reliance on friction as a means for anchoring the lead presents the disadvantage that the lead is not firmly held within the capacitor. When the leads are soldered or welded, the joint formed between the lead and the electrode is often not smooth and can rupture the dielectric when the electrode and lead combination are wound into the dielectric. Furthermore, the leads are conventionally placed so as to contact the electrode in such a manner that they are in a region of electrical stress in the completed capacitor. When the leads are so placed, it is quite possible at a later time, when the capacitor is being soldered into a circuit, for heat from the soldering operation to travel up the leads and cause a melting of the dielectric in the region of electrical stress. Such melting can produce shorts and weak points in the dielectric which will lead to later failure of the capacitor. To combat this problem in part, many manufacturers have used heavier gauge dielectrics. However, since higher capacitance values in a capacitor are obtained from either increasing the area of the electrode foil or decreasing the thickness of the dielectric, it is obvious that the use of a thicker dielectric will mean that a longer length of foil must be used and that the capacitor must have an increased size. The need for longer foils and larger sizes naturally increases the cost of manufacture and limits the market for the capacitor to those areas where small size is not important.

The present invention is directed toward concepts for solving certain problems presented by the prior art as they relate to dielectric breakdown caused by lead attachment, and precision control of low value capacitors.

More particularly, it is an object of this invention to provide capacitors of a small physical size and in a wide range of capacitive values which are capable of being precisely controlled.

It is another object of this invention to provide precision value capacitors having capacitive values as low as 1 picofarad.

Another object of the invention is to provide precision low value wound capacitors in a manner adapted to high rate mechanization and at much less cost than those made with previous processes.

Another object of the invention is to provide a capacitor in which the leads are inserted internally of the capacitor in a manner adapted to high rate mechanization.

Another object of the invention is to provide a capacitor wherein the leads are positively attached to the windings of the capacitor in such a manner as to be out of the electric field between the electrodes.

Another object of the invention is to provide a capacitor having the leads firmly bonded to a dielectric strip other than the strip to which the electrode foils are attached.

Another object of the invention is to provide an extremely low value wound capacitor having substantially single turn electrodes attached to opposite sides of a dielectric film and spaced a predetermined number of turns from each other.

Another object is to provide a capacitor having relatively large capacitive values for a small physical size and which offers great resistance to thermal damage caused by heat traveling into the capacitor through its lead wires during an operation of soldering the capacitor into an electric circuit.

Another object of the invention is to provide a novel method and apparatus for fabricating a wound capacitor in which the leads are strongly attached to a dielectric film.

It is another object of this invention to provide a novel method and apparatus for fabricating a wound capacitor wherein the electrode foils are presented to opposite sides of a dielectric film strip by means of a vacuum holding device and permitted to become attached to the dielectric film by release of the vacuum.

Another object of this invention is to provide a novel method and apparatus for fabricating a wound capacitor wherein the electrode foils are affixed to a dielectric film by electrostatic attraction.

According to the present invention, capacitors can be made which offer the advantage of very precise control of value, small size, and a large degree of inherent thermal protection for the dielectric. Capacitors made in accordance with the present invention are also well adapted to be manufactured on automatic machinery offering a high mechanization rate.

Utilizing the methods and apparatus of the present invention, a capacitor of extremely low value can be made by placing a pair of foils into the wound capacitor in such a manner that they are spaced apart a varying number of turns of dielectric depending upon the capacitive value desired. The particular value obtainable can be derived from an equation. Although it is possible to fabricate extremely low value capacitors in accordance with the teaching of the invention by using conventional lead attachment means and by utilizing only a single dielectric, it has been found to be preferable to attach the leads of the capacitor to a dielectric strip other than the strip to which the foils are attached and roll the leads into contact with the foils during the winding of the capacitor. Leads attached in such a manner provide great resistance against pulling out. Furthermore, inasmuch as the invention contemplates that the leads are placed in contact with the foils in an area which is not within the electric field, there is no danger that the leads can damage the dielectric within the electric field. Another advantage of such lead placement is that heat conducted up the lead at a future time such as during a later soldering operation will have its rate of conduction attenuated by the foil and thereby will be prevented from damaging the dielectric. The protection against thermal damage to the dielectric is particularly great if a foil of low thermal conductivity such as tin foil is used.

In order to mechanize the manufacture of the capacitor, the present invention contemplates the attachment of the electrode foils to the dielectric during the winding of the dielectric. Each foil is attached by means of a vacuum to the periphery of a drum rotating in synchronism with the winding of the capacitor dielectric. As the foil comes in contact with the dielectric film, the vacuum is sequentially released so that the foil can transfer and become attached to the dielectric film. The invention contemplates that the foil will be held to the dielectric film by electrostatic attachment, preferably introduced by a potential applied between a pair of vacuum drums on opposite sides of the film.

The novel features that are characteristic of the invention are set forth with particularity in the appended claims. An understanding of the invention, from a structural and functional standpoint, together with additional objects and advantages thereof, will be best understood by reading the following description in conjunction with the accompanying drawings, wherein:

FIG. 1 is an end view in cross section of a low capacitive value capacitor having several dielectric turns between its foils and its lead wires connected to the foils outside of the electric field (the air spaces between turns are for clarity only and are not present on capacitors);

FIG. 2 is a side view of a portion of the low value capacitor shown in FIG. 1 prior to winding;

FIG. 3 is similar to FIG. 2 and represents a capacitor having more closely spaced electrodes and a higher value;

FIGS. 4–7 show a modification of FIGS. 1–3 wherein a pair of dielectric strips are used and illustrates various stages of the process by which the leads and foils are separately attached to the dielectrics;

Figure 8:
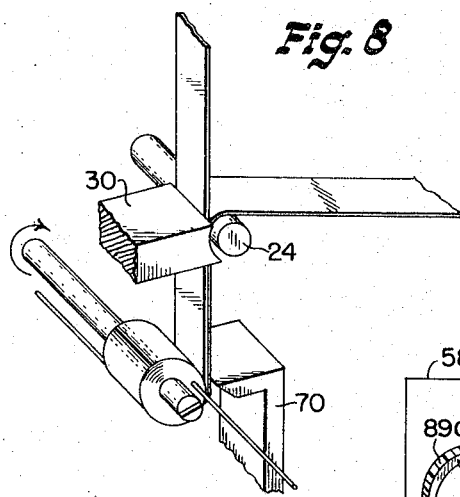
FIG. 8 is a perspective semidagrammatic showing of apparatus usable with the process illustrated in FIGS. 4–7 for sealing a completed capacitor and severing it from the dielectric strips.

The present invention relates to a method and highly mechanized apparatus for constructing a capacitor utilizing a plastic film dielectric which allows accurate value control down to 1 picofarad and below.

In order to achieve a control over the value of C in the aforementioned Equation 1, the invention contemplates that the value of $t$ in the equation rather than the value of A should be changed. Where the dielectrics and foils used in the construction of the capacitor are very thin in comparison to the diameter at which the foils are introduced, and where the foils are long enough to produce one or more slightly more than one complete turn at the diameter where they are introduced, the capacitance C of the capacitor can be found in accordance with the following equation:

Equation 2
$$C = \frac{Kw}{\log_{10} D/d}$$

where C is the capacitance, K is the dielectric constant, $w$ is the width of the electric field region along the cylindrical axis, D is the inside diameter of the outer cylinder, and $d$ is the outside diameter of the inner cylinder.

From a study of Equation 2, it will be observed (FIGS. 2–3) that moving the outside foil 16 away from the inside foil 14 will cause a decrease in the capacitance value for a given dielectric. It is also possible to make capacitors in different ways and yet obtain equal capacitance values. This can be accomplished by varying the factors that make up the ratio $D/d$. For example: for a given mandrel diameter M, $d$ may be varied by the number of dielectric turns taken before introducing the inner foil; for a given $d$, D may be varied by changing the number of dielectric turns after the inside foil is wound in; D or $d$ may also be changed by changing the dielectric gauge while keeping the turns constant. Expressing these variations symbolically:

Equation 3
$$\frac{D}{d} = \frac{d + 2n_2 t}{M + 2n_1 t}$$

where $n_1$ is the turns of dielectric before the inner foil is wound in, and $n_2$ is the turns of dielectric before the outer foil is wound in minus $n_1$.

For any particular dielectric, $n_1$ and $n_2$ are determined by the placement distance of each foil from the mandrel. It is important to note that $n_1$ or $n_2$ do not have to be changed by integers but may be varied continuously by fractions of turns. This provides a vernier for precise value adjustment. The resolution of such an adjustment system is particularly valuable for low values where the foil separation is greater (FIG. 2) since a small capacitor can only have a very small capacitance change and still remain within the desired tolerance spans of 1, 5 or 10 percent.

FIG. 3 shows that the foils 14 and 16 are spaced more closely together than in FIG. 2 and therefore provide a higher capacitive value. Although FIGS. 1, 2 and 3 show the use of a single dielectric film 12 it would also be possible to use two dielectrics 12a, 21 as shown in FIGS. 4–7. The use of two dielectrics is preferred and permits the capacitor to be manufactured at high rate mechanization over a very large range of values. The use of two dielectrics also is important to the attachment of the tabs or leads 18a and 20a by the process set forth in FIGS. 4–7 and with the apparatus of FIG. 11.

In FIGS. 1–3 the leads or tabs 18 and 20 are shown in contact with the foils 14 and 16. Although it is possible to achieve a low value capacitor by attaching the tabs to the foils by means of welding, soldering, or merely friction contact, it is preferable that the leads be affixed to the dielectric as hereinafter described. When the winding of the capacitor (FIG. 1) is completed, the trailing end is cut and may then either be held by a length of pressure sensitive adhesive 22, or heat sealed to the underlying thermoplastic dielectric layers. If desired, the dielectric strip may be marked before it is finally sealed. In most applications it is desirable to heat shrink the finished capacitor in a conventional manner to provide improved mechanical and electrical stability and especially to hold the leads in pressure contact with the foils. In certain applications it may be desirable to wax or resin impregnate the capacitor before or after heat shrinking while in other applications it may be desirable to extend a pressure sensitive wrapping tape over each end of the capacitor to form a pocket for resin end-filling.

To achieve a strong attachment of the leads 18 and 20 to the capacitor and to enable capacitors to be made at a high rate of mechanization, it is preferable that the leads be attached by the process shown in FIGS. 4–7. With this process, the leads or tabs 18a and 20a are affixed, preferably by bonding, to the outer dielectric 21. The foils 14a and 16a are then applied to opposite sides of the inner dielectric 12a in such a manner that an end of each will extend past an end of the other. Such an overlapping construction, in combination with the particular placement of the leads on opposite sides of the outer dielectric 21 permits the leads to be rolled into contact with their respective foils while remaining out of the electric field of the capacitor which comprises the area between the foils. As previously explained, this construction offers great advantages in that it permits the leads to be firmly held within the capacitor body and yet causes no damage to the dielectric within the electric field since the leads only contact dielectric which is not in the electrical field.

Aside from preventing the possibility of mechanical damage due to contact of a soldered or welded lead with a dielectric in the electric field, the method of attachment also makes it possible to produce a capacitor having a large degree of thermal protection for the dielectric within the electrical field. Due to the protection offered the dielectric by the process of lead attachment, it becomes possible to use thinner dielectrics which in turn permit relatively large value capacitances in relatively small size capacitor bodies. As previously discussed, capacitors are often used in circuits where they must be either hand soldered or else dip soldered. Naturally, the soldering operation will cause heat to travel up the leads 18 and 20. If these leads were permitted to contact the dielectric in the region of electrical stress they could cause a melting of dielectric, especially dielectrics such as polystyrene which have a low melting point, which would weaken it and subject it to shorts and breakdowns. In FIG. 1, it can be seen that the leads 18 and 20 are insulated from the dielectric 12 in the region of electrical stress by means of the electrode foils 14 and 16. By choosing from various materials for the foils having different thermal conductivities it is possible to vary the amount of protection offered the dielectric. It has been found that tin foil offers particularly good protection against thermal damage since it has a very low thermal conductivity.

Figure 11:
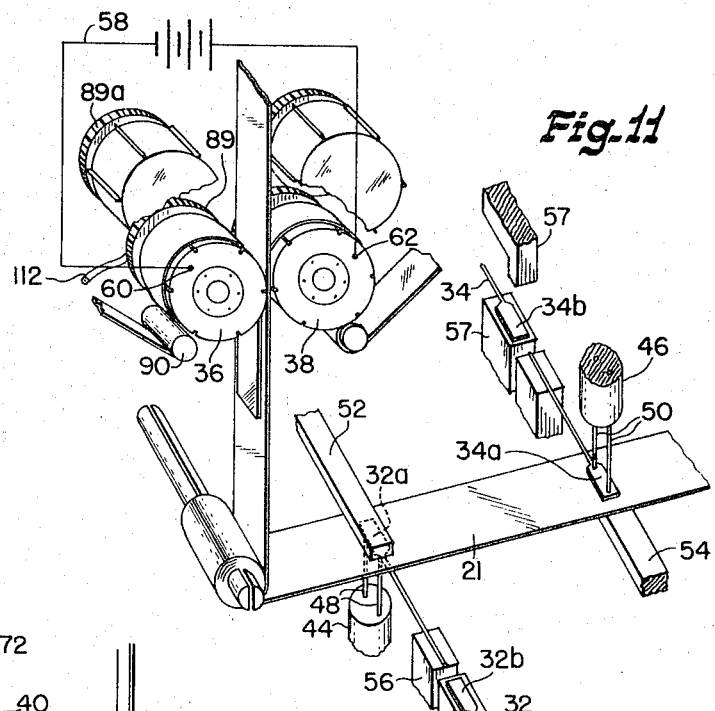
FIG. 11 is a perspective diagrammatic view of an apparatus for performing the process illustrated in FIGS. 4–7.

The process steps of inserting the foils 14a and 16a and attaching the leads 18a and 20a can be performed by the apparatus semidiagrammatically shown in FIG. 11. Details of various structural parts of the apparatus have not been given where they comprise items such as feeding and synchronizing means, electrical circuitry, etc., which are well known, or readily thought of, by those skilled in the art.

The general operation of the apparatus shown in FIG. 11 involves: drawing dielectric films 12a and 21 from supply reels (not shown); stopping the drive and feeding lead wires 32 and 34 from their supply reels (not shown); feeding electrode foils 14a and 16a from their supply reels (not shown) and loading them on inner and outer foil vacuum heads 36, 38 which present them to the dielectric tape where they are held by electrostatic attraction. When the desired length of foil has been fed, the foil is severed by cutter blades 40, which move through the foil and into cutter blade receiving slots 42 in vacuum heads 36, 38.

FIG. 4 shows the strips of dielectric film 12a and 21 at the start of a winding operation. The dielectric strips are placed over a positioning mandrel 26 by action of the gathering pin 24 and pivoted spring loaded gathering pin follower 30. Once the dielectric strips are held against the positioning mandrel 26, the captivating mandrel 28 slides forward to captivate the film. The mandrels are allowed to rotate through one or two turns to build a small core to remove any slack from the dielectric films and are then stopped to await the attachment of the leads.

In FIG. 11, the lead wires 32 and 34 are indexed from a supply means (not shown) so that the lead flats 32a and 34a are respectively positioned under and over the dielectric film strip 21. Forward and rearward contact holders 44, 46 force the spring loaded bonding contacts 48, 50 against the respective lead flats 32a, 34a. Prior to the bonding operation, the forward and rearward reaction plates 52, 54 move into position on the opposite sides of the film 21 to back up the film and prevent the film from being displaced by the loaded contacts 48, 50. A high current is then passed through the bonding contacts 48, 50, heating the short lead flats 32a, 34a. The current rate and duration are accurately controlled to raise the temperature of an area on the lead flats to a temperature just above the melting point of the dielectric film. The bonding contacts 48, 50 quickly extract heat from the lead flats, thereby causing a good bonding between the lead flats 32a, 34a and the dielectric film 21. Simultaneously, the leads 32a, 34a are cut free from their sources while the forward end of the lead wires for the succeeding capacitor are swaged by dies 56 and 57 into the leads 32b and 34b. Following the attachment of the leads, the winding of the dielectric is resumed and the foils 14a, 16a are attached.

The foils 14a, 16a are fed into contact with the dielectric 12a by inner and outer foil vacuum heads 36, 38 which are driven in synchronism with the feeding of the inner dielectric 12a. The foils are held by vacuum in exact position on the drum or head until they are to contact the film. In the region 66, 68 of the drums where contact is made with the film 12a, the vacuum is released to permit the foil to be drawn to the film but without releasing the remainder of the foil from its supply.

To remove the inner and outer foils 14a and 16a from the vacuum heads 36, 38 and attach them to the dielectric film 12a, a potential applying circuit 58 is supplied to apply a potential between the foils. This potential is preferably applied to the vacuum drums 36, 38 through contacts 60 and 62. The potential between the foils causes an electrostatic charge to build up on the inner dielectric 12a which attracts the foils 14a, 16a and causes them to adhere to the dielectric. It has been found that if a potential difference of approximately twice the DC rated working voltage per mil for the particular dielectric film thickness and type is applied to the foils 14a, 16a the foils will be satisfactorily attracted to and held against the dielectric film.

Figure 12:
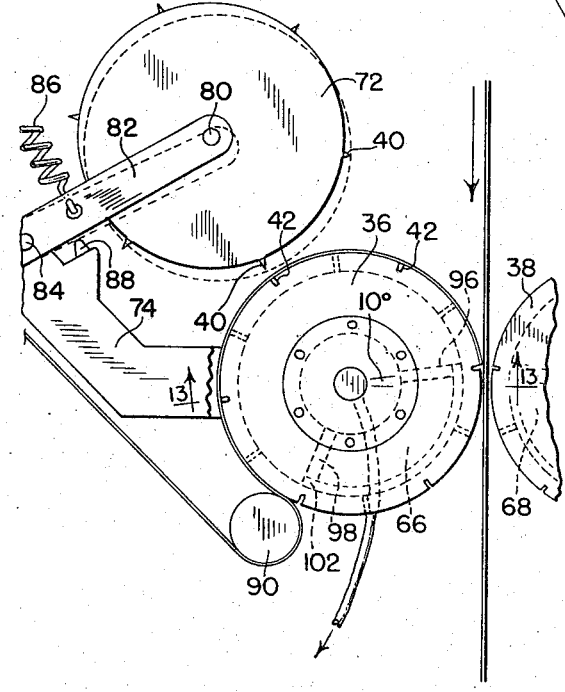
FIG. 12 is a side view of the vacuum feeding drum and cutter drum shown in FIG. 11 when in its non foil-applying position.
Figure 13:
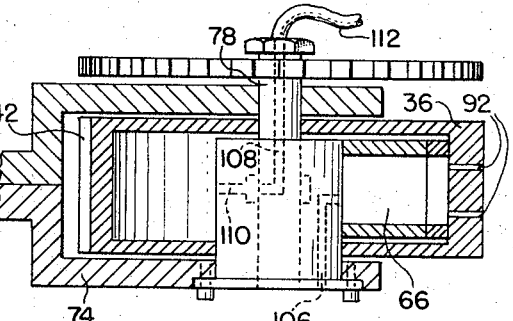
FIG. 13 is a top section view on line 12—12 of the vacuum drum.

FIG. 12 shows the structure of the vacuum drum 36 and associated cutter drum 72 which permits extremely accurate placement of exact lengths of foil 14a on the inner surface of the dielectric film 12a. It will be understood that similar structure is provided for supplying and affixing predetermined exact lengths of outer foil 16a. The vacuum drum 36 is mounted for selected rotational movement with respect to the movement of dielectric 12a on a drum support member 74 on which the vacuum drum is mounted by means of vacuum drum shaft 78. The cutter drum 72 is also mounted on drum support member 74. The cutter drum 72 rotates on cutter drum shaft 80 on cutter support arm 82 pivoted to drum support member 74 by means of pivot pin 84. The cutter drum 72 is normally biased out of engagement with vacuum drum 36 by means of biasing spring 86 to the full line position shown in FIG. 12. When it is desired to cut a length of foil on vacuum drum 36, cutter support arm 82 is momentarily moved by means of a solenoid (not shown) to the dotted line position shown in FIG. 12 and against a stop means 88 and released. To insure that the cutter blades 40 will properly engage the cutter blade receiving slots 42 in the vacuum drum, the cutter drum 72 and vacuum drum 36 are mounted for synchronous rotational movement through a pair of meshing gears 89 and 89a on shafts 78 and 80. Inasmuch as the amount of movement of the cutter blades 40 into the cutter blade receiving slots 42 is very small, in the order of 1/16 of an inch, there is no danger of the synchronizing gears coming out of mesh as their axes move apart.

The foil is fed from a supply means (not shown) to the vacuum drum 36 by passing it over an idler roller 90 which is positioned so as to assure maximum drum contact. The foil is held on the drum and withdrawn from the supply by means of a large number of vacuum ports 92 extending from the interior of the vacuum drum to the periphery. The drum is held stopped when foil is not being fed in a position where the leading end of the foil is 5–10° counterclockwise from the point of tangency of the drum with the dielectric. This positioning permits film to be fed past the drum without contacting the drum when foil is not being fed. In order to permit the foil to leave the drum when it rotates and become affixed to the dielectric film 12a, vacuum release area 66 is provided within the vacuum drum 36. This release area 66 is formed by a portion of bearing 94 which is fixed against rotation to the drum support member 74. Walls 96 and 98 are attached to the bearing and engage the inner drum surface 104 of the vacuum drum by means of wiper portions 100, 102. Communication between the release area 66 and either the atmosphere or a source of air pressure or vacuum other than the vacuum in the remainder of the drum is achieved by means of release area passageway 106 which extends axially of the bearing from the outer end of the bearing and radially into the reelase area 66. Air may be withdrawn from the vacuum drum 36 in order to create a vacuum by means of drum shaft passageway 108 which extends axially down the center of the shaft 78 and then radially outwardly into a groove (not shown) which permits air to be drawn through vacuum opening 110 in the interior of the drum 36 regardless of the position of rotation of shaft 78 relative to opening 110. The vacuum drum shaft passageway 108 may be connected to a source of vacuum by means of vacuum tube 112.

The mechanism shown in FIG. 12 is capable of applying a large number of different lengths of foil to the dielectric 12a. The vacuum drum 36 may apply foil during several rotations of the drum or during a period as short as 1/6 of a revolution of the drum shown since there are six positions around the drum at which the foil may be cut. The length of tape applied depends on the way in which the apparatus is programmed. In addition to the small increments of tape length possible due to the multiplicity of cutter blade receiving slots 42, it is possible to obtain a vernier adjustment which will give an infinite number of variations in the distance between the point of application of the inner foil 14a to one side of the dielectric 12a and the point of application of the outer foil 16a to the opposite side of the dielectric. This variation is obtained by delaying the point at which vacuum drum 38 starts to rotate and apply foil to the dielectric. By varying the lengths of foil applied and the points at which they are applied to the dielectric it is possible to manufacture capacitors having a very large range of capacitive values utilizing the same apparatus. For example, by delaying the application of the outer foil until a short length of inner foil has been covered by several turns of dielectric, it is possible to get extremely low value capacitors of the type shown in FIGS. 1–3. Conversely, by applying longer lengths of foil at approximately the same points on opposite sides of the dielectric, it is possible to achieve higher order capacitive values. After the vacuum heads 36 and 38 have been rotated to bring the foils into contact with the dielectric and the foils transferred, the head rotation is stopped and the rotation of the mandrel assembly 26, 28 is continued to cause the foils and flatted leads 32a, 34a to move into the wound section as shown by FIGS. 4–7. After the electrode foils have been wound in, and additional outer wraps of dielectric wound for mechanical protection, the unit is sealed as shown by FIG. 8. Gathering pin 24, which travels in a circular orbit about the mandrel assembly center 26, 28, leaves its rest position as shown in FIG. 4 and gathers the dielectric films against the gathering pin follower 30 which moves in a C-shaped path. With the dielectrics under slight tension, the heated sealing assembly 70 is moved into contact with the dielectrics to melt the dielectrics along a line. By this action, the dielectrics, which are under tension, are severed and the outer dielectric wraps are neatly sealed to the wound unit. An apparatus for performing such a cutting and sealing operation is described in U.S. Patent 2,950,070 assigned to the common assignee.

After sealing, the mandrels 26, 28, are extracted and the wound capacitor falls onto a conveyor oven belt (not shown) which carries the part through a controlled thermal cycle to shrink the dielectric film in a conventional manner. The oven temperature and belt speed are adjustable to the shrinking requirement of the particular film type. If desired, the capacitors may be tested and marked after they leave the oven.

Figures 9, 10:
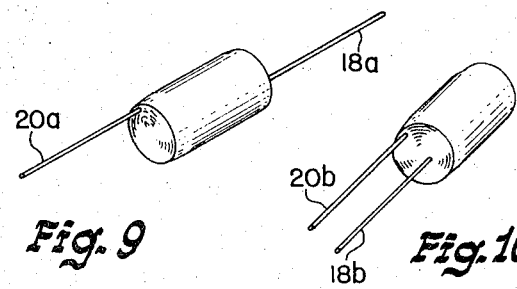
FIG. 9 is a perspective view of a capacitor made in accordance with the present invention wherein the leads extend from opposite ends of the capacitor.
FIG. 10 is a perspective view of a capacitor made in accordance with the present invention wherein the leads extend from the same end of the capacitor.

FIGS. 9–10 illustrate two different positions in which the leads may be inserted in the capacitor in accordance with the present invention. FIG. 9 shows leads 18a, 20a extending from opposite ends while FIG. 10 shows leads 18b, 20b extending from the same end. When the leads extend from the same end, it is desirable that they extend from different sides of the axis so as to minimize the chance of touching each other.

I claim:
1. A wound capacitor comprising:
convoluted dielectric strip means;
an inner electrode member,
an outer electrode member spaced from said inner electrode member by portions of said dielectric strip means and defining a region of electrical stress therebetween; and a pair of lead members bonded to said dielectric strip means and positioned interiorly of said capacitor and in contact with said electrode members, one of said pair of lead members being positioned interiorly of said first electrode and outside said region of electrical stress, and the other of said pair of lead members being positioned exteriorly of said second electrode and outside said region of electrical stress.

2. The capacitor of claim 1 wherein the electrode members comprise a foil of a relatively low thermal conductivity compared to the leads, whereby the rate of conduction of heat from a lead wire to the dielectric in the region of electrical stress when said lead is heated during a later soldering operation will be greatly attenuated.

3. A wound capacitor as defined in claim 1 wherein said leads are affixed only to said dielectric strip means and are held in contact with said electrode members by the pressure exerted on the leads and electrode members by the convolutions of dielectric wound on either side thereof.

4. A wound capacitor as defined in claim 3 wherein said dielectric strip means comprise a pair of dielectric strips;

each of said electrodes being affixed to a dielectric strip; and each of said pair of leads being bonded to a dielectric strip other than the one to which its associated electrode is affixed.

5. A wound capacitor comprising:

a first convoluted dielectric strip member, an inner electrode member positioned in contact with the inner side of said first dielectric strip member, an outer electrode member positioned in contact with the outer side of said first dielectric strip member and in overlapping relation with the inner electrode member, a second convoluted dielectric strip member wound together with said first dielectric strip member and said inner and outer electrode members for preventing said electrode members from contacting each other, a first lead member positioned in contact with one of said electrode members and said second dielectric strip, a second lead member positioned in contact with the other of said electrode members and said second dielectric strip, each of said lead members being positioned out of the region of electrical stress between said overlapping electrodes.

6. The capacitor of claim 5 wherein at least one of said first and second leads contacts its associated electrode at a point wherein said associated electrode is circumferentially spaced from an end of the other electrode by less than one convolution of the first convoluted dielectric strip which separates the electrodes.

References Cited

FOREIGN PATENTS 465,289    4/1937   Great Britain.
807,475    7/1956   Great Britain.

DARRELL L. CLAY, *Primary Examiner.*

L. H. MYERS, *Examiner.*

E. A. GOLDBERG, *Assistant Examiner.*